US005596975A

United States Patent [19]

Thomas et al.

[11] Patent Number: 5,596,975

[45] Date of Patent: Jan. 28, 1997

[54] METHOD OF PULSE WIDTH MODULATING AN OXYGEN SENSOR

[75] Inventors: Christopher P. Thomas, West Bloomfield; Timothy A. Coatesworth, Lake Orion; Kenneth P. DeGroot, Macomb Twp.; Jeffery C. Ehlers, Davisburg; Mark E. McMackin, Royal Oak; Keith L. Jones, Woodhaven, all of Mich.

[73] Assignee: Chrysler Corporation, Auburn Hills, Mich.

[21] Appl. No.: 575,920

[22] Filed: Dec. 20, 1995

[51] Int. Cl.[6] .......................... F02D 41/14; G01N 27/416

[52] U.S. Cl. .......................... 123/686; 123/697; 73/23.25; 73/23.32

[58] Field of Search .................................... 123/686, 689, 123/697, 685; 73/23.25, 23.32; 204/408

[56] References Cited

U.S. PATENT DOCUMENTS

| | | | |
|---|---|---|---|
| 4,291,572 | 9/1981 | Maurer et al. | 73/23.31 |
| 4,464,244 | 8/1984 | Uchida et al. | 204/425 |
| 4,471,648 | 9/1984 | Uchida et al. | 73/25.03 |
| 4,510,036 | 4/1985 | Takeuchi et al. | 204/425 |
| 4,655,182 | 4/1987 | Nakano et al. | 123/179.1 |
| 4,708,777 | 11/1987 | Kuraoka | 123/697 |
| 4,721,088 | 1/1988 | Mieno et al. | 123/686 |
| 4,753,204 | 6/1988 | Kojima et al. | 123/678 |
| 4,808,009 | 2/1989 | Sittler et al. | 374/178 |
| 4,889,098 | 12/1989 | Suzuki et al. | 123/678 |
| 4,963,246 | 10/1990 | Nakajima et al. | 204/406 |
| 4,993,392 | 2/1991 | Tanaka et al. | 73/23.32 |
| 5,245,979 | 9/1993 | Pursifull et al. | 123/690 |
| 5,353,775 | 10/1994 | Yamashita et al. | 123/686 |

*Primary Examiner*—Andrew M. Dolinar
*Attorney, Agent, or Firm*—G. Andrew Barger

[57] ABSTRACT

A method for pulse width modulating a resistance element of an oxygen sensor. The method quickly heats the resistance element of the oxygen sensor soon after start of the engine with a relatively high duty cycle yielding wide pulse widths. During a mid oxygen sensor temperature range, the method decreasing the duty cycle and thereby the pulse width modulation. And, upon the oxygen sensor reaching peak operating temperature range, the method decreases the pulse width modulated voltage signal supplied to the oxygen sensor to relatively short duty cycled pulses.

3 Claims, 3 Drawing Sheets

METHOD OF PULSE WIDTH MODULATING AN OXYGEN SENSOR

BACKGROUND OF THE INVENTION

1. Field of the Invention

The present invention relates, generally, to the art of oxygen sensors. In particular, the present invention relates to a method for pulse width modulating an oxygen sensor to quickly heat the sensor to within operating temperature range and maintain this range for all subsequent operating conditions of the vehicle.

2. Description of the Related Art

Oxygen sensors are typically used in a vehicle's exhaust system to sense varying amounts of oxygen so that the fuel to air ratio of exhaust gasses emanating from the engine can be calculated by an engine controller or Electronic Control Unit (ECU). When the vehicle runs rich, i.e. a large amount of fuel is present in comparison to air, large amounts of hydrocarbons (HC) are present in the vehicle exhaust. In contrast, when the vehicle runs lean, i.e. a large amount of air is present in comparison to fuel, large amounts of nitrous oxide (NOX) may be present in the vehicle exhaust. NOX is the main ingredient of ground level ozone that is commonly referred to as "smog." Carbon monoxide (CO) is present in both of the above operating conditions. Oxygen sensors are typically placed in the exhaust system of the vehicle, one upstream and one downstream of the catalytic converter, so that the operating efficiency of the catalytic converter in purifying the HC, NOX, and CO gases may be monitored via the ECU.

The oxygen sensors have a specific operating temperature range, and may not detect proper amounts of oxygen prior to reaching this range given inherent sensor limitations. Therefore, it is desirable to have the sensors quickly heated, after start-up, to within the operating temperature range thereby allowing for peak operation and oxygen detection. It has been demonstrated that the oxygen sensors will begin to be heated by the heat of the engine exhaust. Since the exhaust is relatively cool upon start of the engine or at idle, the oxygen sensors may actually be cooled by the engine exhaust. This has caused many in the industry to time delay when the ECU can go closed loop, i.e. when the ECU will take readings from the oxygen sensors. This time delay can be as long as 45 seconds after startup.

The industry has tried to remedy the operating limitations of oxygen sensors by providing other means of heating the oxygen sensors. This has typically been accomplished by equipping oxygen sensors with low resistance heating elements that are in contact with the inner core element of the oxygen sensor. Since heater performance is inversely proportional to the resistance. The lower the resistance, the quicker the heater will reach its desired temperature operating range. If the heater is too low in resistance, however, the heater will ramp to high temperature that is out of its operating range. As a result, the inner core element of the sensor may crack or otherwise have a degradation in performance by not giving accurate readings to the ECU.

Still other oxygen sensor systems supply maximum electrical power to the single heater for a set time after start-up and regulate the power thereafter. This requires the use of complex and costly circuitry for regulating voltage supplied to the heater. Wave shaping circuitry is also required for shaping current waveforms supplied to the sensor heater.

It is therefore desirable in the art of oxygen sensors to use a single low resistance heating element that quickly heats a sensor to within operating temperature range and maintains this range for all subsequent operating conditions of the vehicle.

SUMMARY OF THE INVENTION

In light of such desirable characteristics, not fully present in the related art, the present invention provides a method for pulse width modulating a resistance element of an oxygen sensor. The oxygen sensor has a start temperature range, a mid temperature range, and an operating temperature range.

The method comprises the steps of determining whether the oxygen sensor is within the operating temperature range and setting a pulse width modulated voltage signal supplied to the resistance element equal to an operating range pulse width value if the oxygen sensor is within the operating temperature range. The method also comprises the steps of determining whether the oxygen sensor is within the mid temperature range if the oxygen sensor is not within the operating temperature range, and setting the pulse width modulated voltage signal supplied to the resistance element equal to a mid range pulse width value if the oxygen sensor is within the mid temperature range. The method further determines whether the oxygen sensor is within the start temperature range if the oxygen sensor is not within the mid temperature range, setting the pulse width modulated voltage signal supplied to the resistance element equal to a start range pulse width value if the oxygen sensor is within the start temperature range.

An advantage of the present invention is that a method for pulse width modulating a resistance element of an oxygen sensor.

A further advantage of the present invention is that a method is provided for expediently bringing an oxygen sensor to within peak operating temperature shortly after start-up.

A still further advantage of the present invention is that a method is provided for maintaining an oxygen sensor at its peak operating temperature during all engine conditions after reaching the operating temperature range.

Another advantage of the present invention is that a method for precisely regulating the temperature of an oxygen sensor is provided using only a singular oxygen sensor resistance element.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
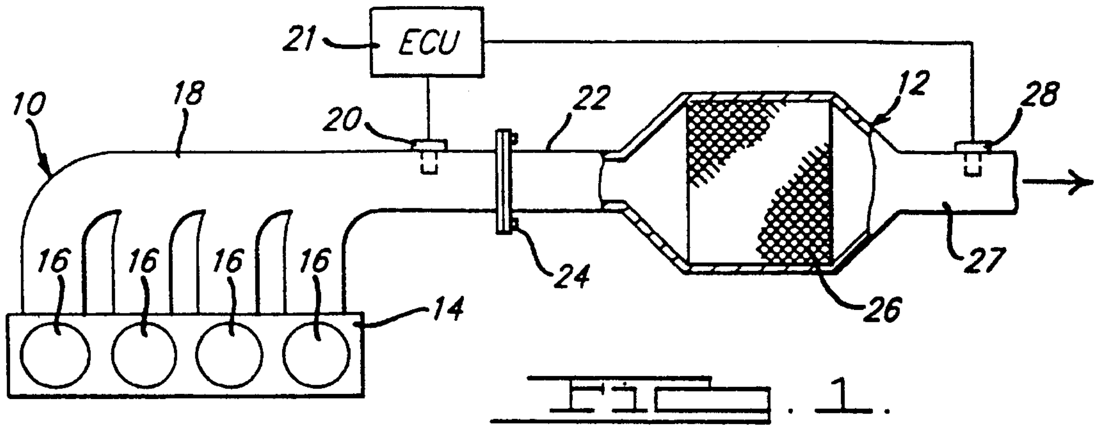
FIG. 1 is a block schematic view of an engine exhaust system and sensor control circuit of the present invention.

Commencing with FIG. 1, an engine exhaust system 10 is shown. An engine block 14 for an internal combustion engine is displayed having four cylinders 16 that emit exhaust gases into an engine manifold 18. It is understood that the present invention will work equally well, regardless of the number of cylinders a particular engine is equipped with. An upstream oxygen sensor 20 projects into the exhaust manifold 18 for sensing an amount of oxygen present in the exhaust manifold 18. The upstream oxygen sensor 20 is also switchingly coupled to an ECU 21. The ECU 21 has memory (volatile and nonvolatile)(not shown), software for performing the task of engine control and method execution, and at least one data communication line. An engagement seal 24 is provided for sealingly engaging the exhaust manifold 18 to a catalytic converter inlet passageway 22 and also providing air flow communication therebetween. In operation, the engine exhaust that emanates from cylinders 16 travels through the exhaust manifold 18 and into the catalytic converter inlet passageway 22 whereby the exhaust is partially purified by the catalyst 26 disposed within the catalytic converter 12. The exhaust then passes by a downstream oxygen sensor 28 that projects into a catalytic converter outlet passageway 27. The downstream oxygen sensor 28 is switchingly coupled to the ECU 21. Finally, the exhaust exits the vehicle (not shown) to the atmosphere via a tailpipe (not shown).

Figure 2:
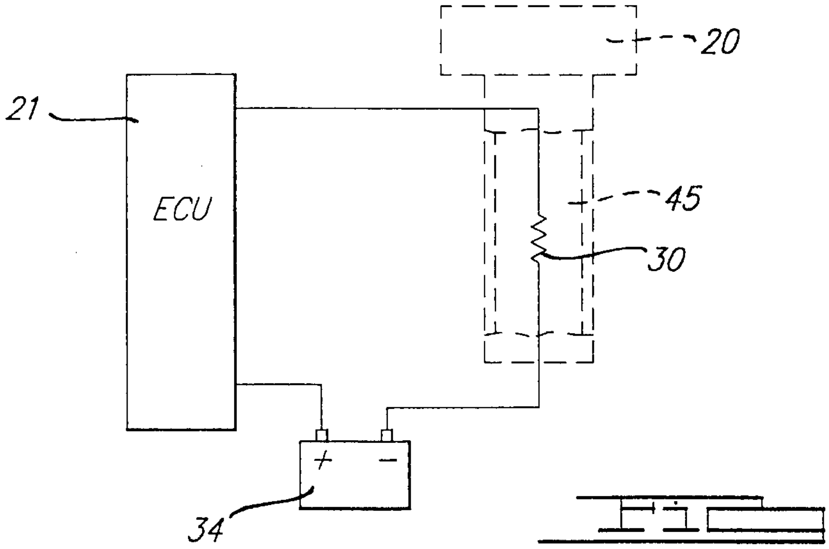
FIG. 2 is a circuit schematic of the present invention.

Referring now to FIG. 2, a circuit for an oxygen sensor 20 is shown. A resistance element 30, is in contact with a core element 45 of sensor 20. It should be appreciated that the present invention will work equally well given a plurality of oxygen sensors, each having separate connections to ECU 21 and power source 34. In the preferred embodiment, however, only the upstream and downstream oxygen sensors 20, 28 are referenced and the power source 34 is a vehicle battery. Upstream sensor 20 is used as the primary example throughout the figures. Moreover, the term "resistance element" will be used throughout in reference to a DC circuit, it is understood, however, that the elements could also represent an "impedance element" if an AC circuit is employed. In the preferred embodiment, resistance element 30 is of a generally low resistance value. The oxygen sensor 20 has a sensor specific operating temperature range, present designs being 900 to 1200 degrees Fahrenheit.

The first terminal of resistance element 30 is connected to the ECU 21. While the second terminal of resistance element 30 is connected to the negative terminal of battery 34 or ground. Power is provided to the ECU 21 via the positive terminal of battery 34 that is connected to the ECU 21. In the present invention, the two components of pulse wave modulation, signal frequency and duty cycle, are controlled by the ECU 21. The signal frequency part of pulse wave modulation is the frequency of the signal supplied to each electrical component that is being pulse wave modulated, while the duty cycle is defined as the percentage of "on" time versus "off" time for the component.

Figure 4:
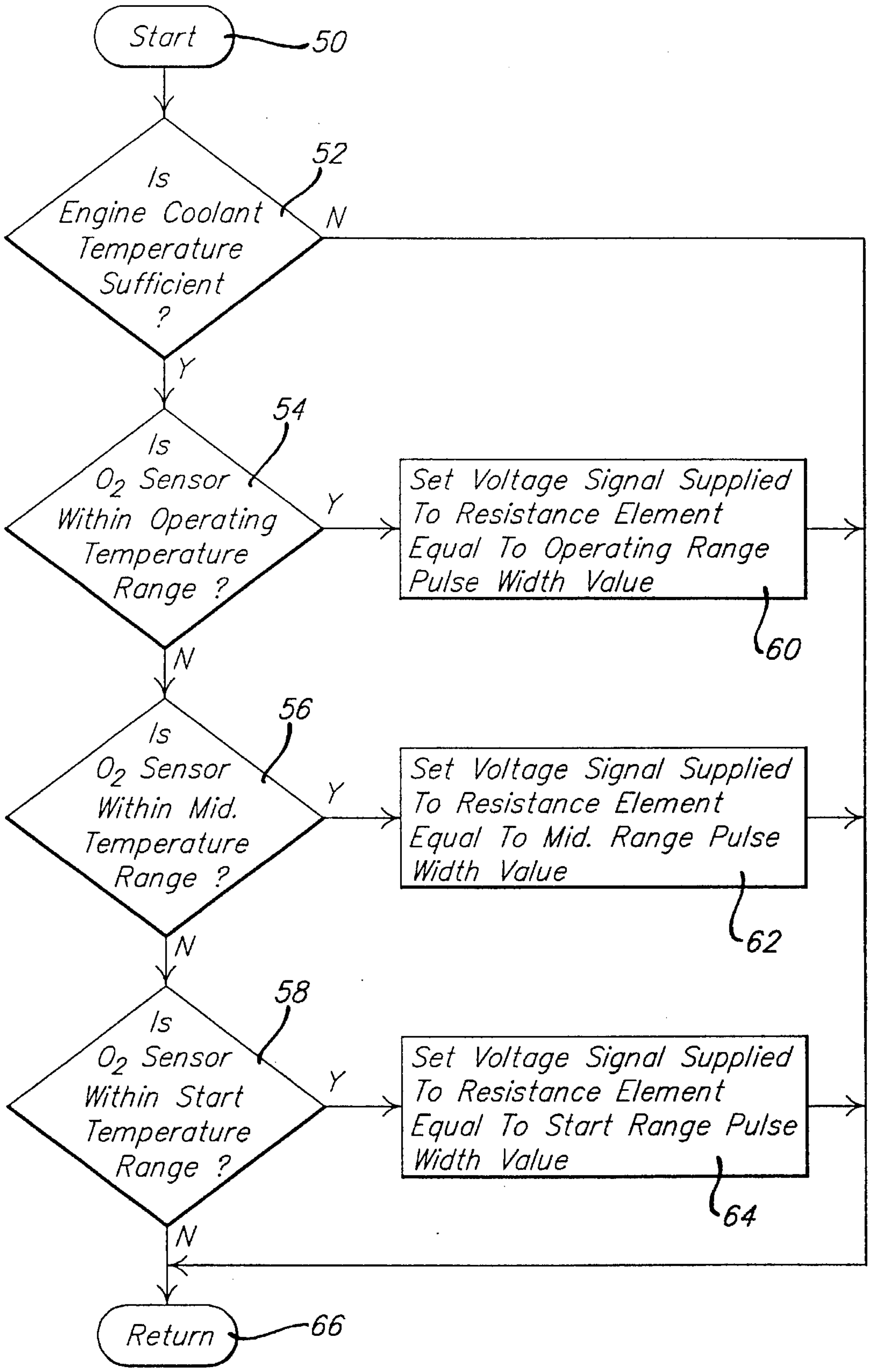
FIG. 4 is a flow chart of a method for heating an oxygen sensor of the present invention.

As depicted in FIG. 4, when the vehicle is started, the ECU 21 sends a pulse width modulated voltage signal through low resistance element 30, via the first terminal of low resistance element 30. The pulse width modulation occurs as a result of the ECU 21 suppling a relatively high duty cycled voltage signal to the low resistance element 30. The signal supplies voltage to the resistance element 30 in long increments. Such duty cycling of the resistance element 30 quickly heats the oxygen sensor 20 during the oxygen sensor start temperature range.

As the oxygen sensor 20 begins to heat, the duty cycled voltage signal supplied to the resistance element 30 is decreased such that a slowing of the heating of the oxygen sensor 20 is effected. As shown in FIG. 4, once the temperature of the oxygen sensor 20 reaches the oxygen sensor operating temperature range, the duty cycled signal supplied to the resistance element 30 is decreased even more so that oxygen sensor 20 remains in its operating temperature range for all subsequent operating conditions of the vehicle.

Figure 3:
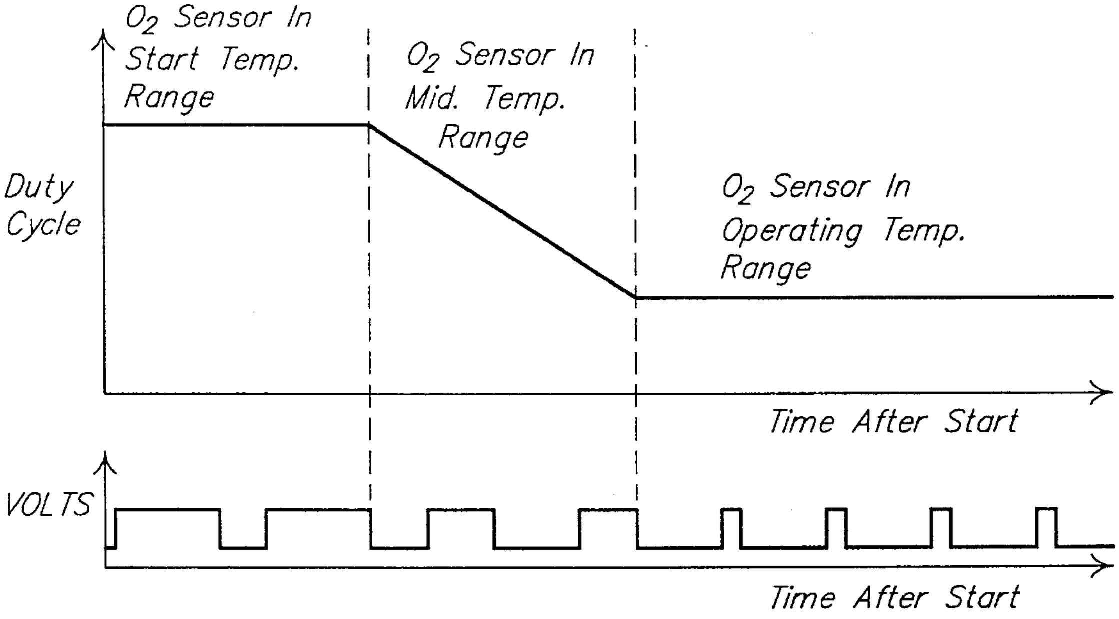
FIG. 3 is a pulse width modulated voltage signal and an associated duty cycle component signal representation that are supplied to the oxygen sensor of the present invention.

Referring to FIG. 3, a method for pulse width modulating a resistance element of an oxygen sensor is shown. The method starts in bubble 50 and continues to decision block 52. In block 52 it is determined whether at least one engine enabling condition is met. In the preferred embodiment, the engine coolant temperature is checked to determine whether it is under 100 degrees Fahrenheit. It is understood that other engine parameters may be calculated such as the change in Manifold Absolute Pressure (ΔMAP), engine RPM, throttle position, etc. If the answer in decision block 52 is no, the method falls to bubble 66 whereby it returns to perform other tasks of engine control.

If, however, the answer in block 52 is yes, the method falls to decision block 54 whereby it is determined whether the oxygen sensor 20 is within operating temperature range. If the answer in decision block 54 is yes, the method advances to task block 60. In block 60 the method sets a voltage signal supplied to the resistance element 30 of oxygen sensor 20 equal to an operating range pulse width value as shown in FIG. 4. The method then advances to bubble 66 whereby the method returns to perform other tasks of engine control. If the answer in decision block 54 is no, the method falls to decision block 56 whereby it is determined whether the oxygen sensor 20 is within mid temperature operating range. If the answer in decision block 56 is yes, the method advances to task block 62. In block 62 the method sets the pulse width modulated voltage signal supplied to the resistance element 30 of sensor 20 equal to a mid range pulse width value. The method then advances to bubble 66 whereby the method returns to perform other tasks of engine control.

If, however, the answer in decision block 56 is no, the method falls to decision block 58. In this block it is determined whether the oxygen sensor 20 is within a start temperature operating range. If the answer is yes, the method advances to task block 64 whereby the voltage signal supplied to resistance element 30 of the oxygen sensor 20 is set equal to a start range pulse width value. The method then advances to bubble 66 where the method returns to perform other tasks of engine control. If the answer in decision block 58 is no, the method falls to bubble 66 and the method exits to perform other tasks of engine control.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A method for pulse width modulating a resistance element of an oxygen sensor, the oxygen sensor having a start temperature range, a mid temperature range, and an operating temperature range, the method comprising the steps of:

determining whether the oxygen sensor is within the operating temperature range;

setting a pulse width modulated voltage signal supplied to the resistance element equal to an operating range pulse width value if the oxygen sensor is within the operating temperature range;

determining whether the oxygen sensor is within the mid temperature range if the oxygen sensor is not within the operating temperature range;

setting the pulse width modulated voltage signal supplied to the resistance element equal to a mid range pulse width value if the oxygen sensor is within the mid temperature range;

determining whether the oxygen sensor is within the start temperature range if the oxygen sensor is not within the mid temperature range; and setting the pulse width modulated voltage signal supplied to the resistance element equal to a start range pulse width value if the oxygen sensor is within the start temperature range.

2. A method for pulse width modulating a resistance element of an oxygen sensor, the oxygen sensor having a start temperature range, a mid temperature range, and an operating temperature range, the method comprising the steps of:

determining whether an engine coolant temperature is below an operational value;

returning to perform other tasks of engine control if the engine coolant temperature is not below the operational value;

determining whether the oxygen sensor is within the operating temperature range if the engine coolant temperature is below the operational value;

setting a pulse width voltage modulated voltage signal supplied to the resistance element equal to an operating range pulse width value if the oxygen sensor is within the operating temperature range;

determining whether the oxygen sensor is within the mid temperature range if the oxygen sensor is not within the operating temperature range;

setting the pulse width modulated voltage signal supplied to the resistance element equal to a mid range pulse width value if the oxygen sensor is within the mid temperature range;

determining whether the oxygen sensor is within the start temperature range if the oxygen sensor is not within the mid temperature range;

setting the pulse width modulated voltage signal supplied to the resistance element equal to a start range pulse width value if the oxygen sensor is within the start temperature range; and returning to perform other tasks of engine control.

3. The method for pulse width modulating a resistance element of an oxygen sensor of claim 2 wherein the engine coolant temperature is operational below a value of 100 degrees Fahrenheit.

* * * * *